United States Patent
Wyers (12) 
(10) Patent No.: US 8,428,664 B1
(45) Date of Patent: Apr. 23, 2013

(54) CASE ASSEMBLY FOR HANDHELD ELECTRONIC DEVICES AND METHOD OF USE THEREFOR

(76) Inventor: Philip W. Wyers, Centennial, CO (US)

( * ) Notice: Subject to any disclaimer, the term of this patent is extended or adjusted under 35 U.S.C. 154(b) by 242 days.

(21) Appl. No.: 13/037,319

(22) Filed: Feb. 28, 2011

Related U.S. Application Data (60) Provisional application No. 61/339,003, filed on Feb. 27, 2010.

(51) Int. Cl.
*H04W 88/02* (2009.01)

(52) U.S. Cl.
USPC ........................................................ 455/575.1

(58) Field of Classification Search .... 455/575.1–575.8, 455/550, 90.1, 41.2, 573.1, 404.1–404.2, 455/556.1, 347, 456.1–456.4, 90.3, 128, 455/446; 24/3.1; 361/679.55, 679.09, 679.4, 361/679.1, 679.46, 679.58, 679.41; 224/154, 224/600, 576, 648, 454; 206/320, 522; 248/454, 248/226.11
See application file for complete search history.

(56) References Cited

U.S. PATENT DOCUMENTS

| | | | | |
|---|---|---|---|---|
| 5,561,436 A * | 10/1996 | Phillips | ........................ | 343/702 |
| 6,244,873 B1 * | 6/2001 | Hill et al. | ...................... | 434/236 |
| 6,934,517 B2 * | 8/2005 | Fujihashi | ...................... | 455/90.1 |
| 7,778,026 B2 * | 8/2010 | Mitchell | .................. | 361/679.55 |
| 8,260,384 B2 * | 9/2012 | Wulff et al. | ................ | 455/575.6 |
| 2002/0000972 A1 * | 1/2002 | Boudewijns et al. | .......... | 345/157 |
| 2005/0009584 A1 * | 1/2005 | Park et al. | ................... | 455/575.6 |
| 2005/0250530 A1 * | 11/2005 | Tanaka | ........................ | 455/550.1 |
| 2006/0030375 A1 * | 2/2006 | Tanaka | ........................ | 455/575.1 |
| 2009/0270050 A1 * | 10/2009 | Brown | .......................... | 455/90.3 |

* cited by examiner

*Primary Examiner* — Melody Mehrpour (74) *Attorney, Agent, or Firm* — Brian D. Smith, P.C.

(57) ABSTRACT

A protective case assembly including a shell defining an open front and having sides as well as a base which adjoins the shell's sides is disclosed. The shell attaches to the handheld device by being sized and configured to fit over the backside and sides of the device. In addition, the case assembly includes an elongated elastic strap of predetermined length and width which is attached at its ends to the back of the shell. The strap is positioned against the base and is sufficiently taut to enable the handheld device to be held in one hand and operated with the thumb of the same hand when up to two of the three middle fingers also of the same hand are placed under the taut strap.

23 Claims, 10 Drawing Sheets

CASE ASSEMBLY FOR HANDHELD ELECTRONIC DEVICES AND METHOD OF USE THEREFOR

CROSS REFERENCE TO RELATED APPLICATIONS

This application is a nonprovisional application claiming the benefit under 35 USC 119(e) of U.S. provisional application Ser. No. 61/339,003 filed on Feb. 27, 2010, which is incorporated herein by reference.

TECHNICAL FIELD OF THE INVENTION

This new and innovative device relates to various handheld electronic devices such as modern phone and music player devices, TV remote controls, game players, etc., the most prominent of which are cell phones and music players whose larger size and stylish shapes, while functional and attractive, make them difficult to safely and comfortably hold. Further, the complexity and delicate nature of most of these devices make them prone to expensive damage or worst case, a total loss should they be accidentally dropped.

BACKGROUND OF THE INVENTION

In focusing on phones and music players, it is well documented that over the years there have been numerous variations of phone and music player cases that come in all shapes, colors, sizes and textures. These cases are designed primarily to protect the phone or music player from damage of everyday use, as well as, for personalization in the form of unique coloring, or rubberized coatings to make them less slippery to hold. There are even cases that have plastic clips for belts, or large bands for holding the device around the upper arm, or leg, or waist for jogging, walking or exercise.

The prior art cases and clips work adequately for their intended uses. However, none of these prior art cases provide the much needed ability to control the phone or music player safely and securely with one hand while at the same time allowing its user free use of their thumb, and or index finger. Controlling the phone becomes even more difficult and exaggerated when its user has smaller hands, or possibly elderly persons who have lost hand dexterity due to arthritis, or for those people who have had a physical injury or possibly digit amputation.

Unlike the known prior art described above that have numerous limitations, the innovative new device provided by the present invention over comes the extensive shortcomings of the prior art. This is achieved by not only providing in one embodiment, a protective case for the devices in question, but also by providing an integrated structure, in the form of a non-sagging, close fitting, flexible band or skin, made of various materials (rubber, elastic, plastic, foam, lycra, spandex, nylon, neoprene, cloth) which allows the fingers of the hand to remain snugly in contact with the device to prevent accidental dropping of the device, and facilitates single one hand operation of the media device/remote control by freeing the thumb and index finger to provide full range coverage over the entire face of the device for touch screens, or pressing a wide range of buttons or keys over a large area.

SUMMARY OF THE INVENTION

The present invention addresses the foregoing concerns by providing a thin protective case assembly for a generally thin small handheld device such as a cell phone, mobile smart phone, remote control and the like. This type of handheld device is typically less than six inches long, less than 3.5 inches wide and less than 0.75 inches thick. An exemplary embodiment of the present innovative device is directed to the safe, comfortable and easy use of handheld phones, music player devices and other handheld electronic devices with the objective of greatly reducing the possibility of dropping or losing control of the device.

The protective case assembly of the present invention in its broadest sense includes a shell defining an open front and having sides as well as a base which adjoins said shell's sides. The shell attaches to the handheld device it is designed to protect by being sized and configured to fit over the backside and sides of the device. In addition, the case assembly includes an elongated elastic strap of predetermined length and width which is attached at its ends to the back of the shell. The strap is positioned against the base and is also sufficiently taut to enable the handheld device to be held in one hand and operated with the thumb of the same hand when up to two of the three middle fingers also of the same hand are placed under the taut strap.

In a preferred embodiment, the strap is removable. In this embodiment, a first connector is located at the strap's first end. A second connector located at a first end of the shell base for cooperating with the first connector is also provided for removably attaching the first end of the strap to the first end of the shell's base. In addition, a third connector located at the second end of the strap is provided while a fourth connector located at a second end of said shell's base for cooperating with the third connector is also provided for removably attaching the second end of the strap to the second end of the shell's base. The predetermined length, width and elasticity of the strap is such that when the first and second ends of the strap are attached to the first and second ends of the shell's base the strap will be positioned against the base and will also be sufficiently taut to enable the handheld device to be held in one hand and operated with the thumb of the same hand when up to two of the three middle fingers also of the same hand are placed under the taut strap.

The method of the present invention involves inserting a handheld device having real or virtual keys located on the front of the device into the foregoing shell. Up to two of the three middle fingers of a user's hand are then placed under the taut strap positioned against the base of the shell. The device may then be operated in one hand by pressing the real or virtual keys located on the device with a thumb of the same hand when, as mentioned, up to two of the three middle fingers of the same hand are placed under the taut strap.

Other aspects and advantages of the present invention will be apparent from the following detailed description of the preferred embodiments and the accompanying drawing figures.

BRIEF DESCRIPTION OF THE DRAWINGS

Preferred embodiments of the present invention are described in detail below with reference to the attached drawing figures, wherein.

The drawing figures do not limit the present invention to the specific embodiment disclosed and described herein. The drawings are not necessarily to scale, emphasis instead being placed upon clearly illustrating the principles of the invention.

DETAILED DESCRIPTION OF PREFERRED EMBODIMENTS

Referring now to the drawings, FIGS. 1-3 and 6-13 illustrate a thin protective case assembly 10 of the present invention for fitting over, protecting and allowing greater manipulation of the handheld device 12 held in the case. Handheld device 12 illustrated in the drawings is an I-phone 4 (referred to herein as smart phone 12) and case assembly 12 is specifically designed for this I Phone. While an I-Phone 4 case is shown, it will be appreciated that embodiments of the present invention can be made for virtually any handheld electronic device such as virtually all cell phones, smart phones, the Ipod Touch or other wifi devices and even devices such as remote controls etc.

Figures 1, 2:
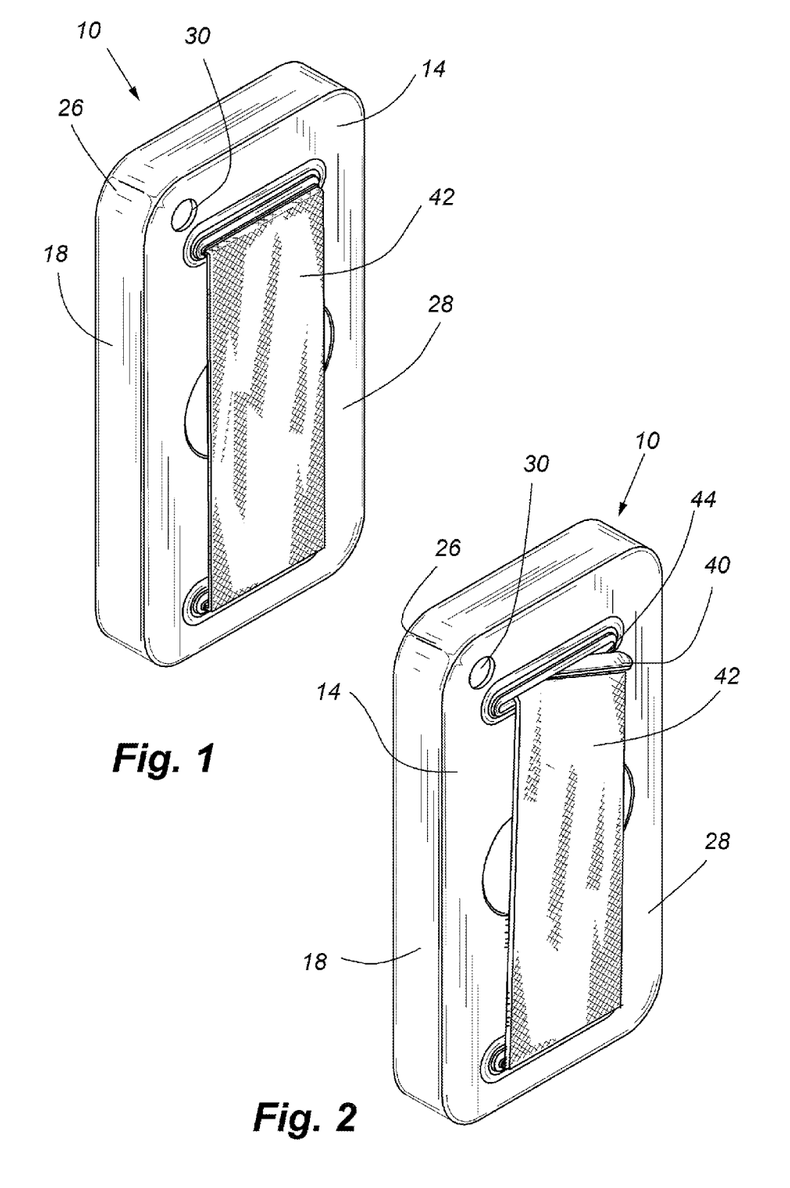
FIG. 1 is a perspective view showing the backside of a protective case assembly of the present invention for a mobile phone.
FIG. 2 is a perspective view of the embodiment shown in FIG. 1 which illustrates the position of an end connector of the strap of FIG. 1 as it would appear as it is being inserted through a slot of the case to removably attach the strap to the case, the end of which engages a recessed receiving member provided in the case's inside surface.
Figure 3:
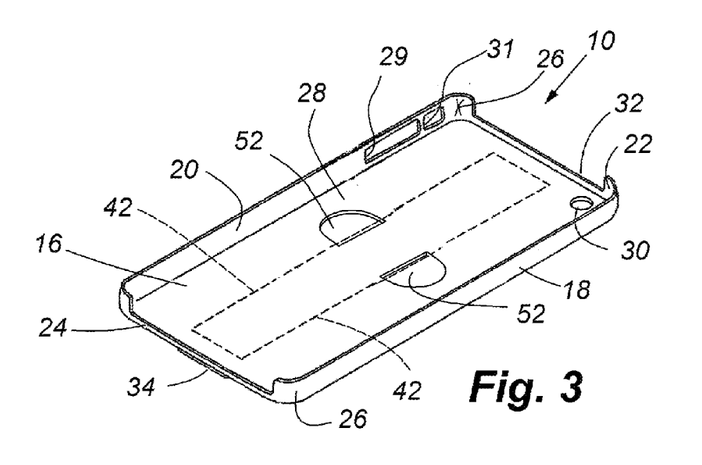
FIG. 3 is a perspective view showing the front side of the protective case assembly of FIG. 1.

As best shown in FIG. 3, case 10 has a shell 14 which defines an open front 16 through which phone 12 is inserted to fit the case over the phone. Case 10 is preferably made from a relatively hard plastic such as ABS which has some resiliency so that the phone in a sense snaps into the case when the phone is placed in the case through its open front 16. While hard cases are generally preferred, the invention is just as easily implemented with a soft shelled case made from softer pliable rubber materials.

As also shown, shell 14 which is generally rectangularly shaped has long sides 18, 20 which adjoin short sides 22, 24 at corners 26 of the shell. Shell 14 also has a base 28 which adjoins all sides 18-24 and corners 26 and, as such, is essentially a molded one piece unit made by injection molding.

Shell 14 is also provided with a number of openings such as openings 29, 30 and 31 and cutouts 32, 34 in sides 22, 24 which allow the cell phone user to access various features of phone 12. In addition, an elongated elastic strap of predetermined length and width is provided which is attached at its ends to the back of the shell. The strap is positioned against the base and is also sufficiently taut to enable the handheld device to be held in one hand and operated with the thumb of the same hand when up to two of the three middle fingers also of the same hand are placed under the taut strap.

In the preferred illustrated embodiment, strap 42 is removable from the shell. To provide this functionality, base 28 of shell 14 defines a pair of racetrack shaped recessed elongated members or recessed connectors 36 shown in FIG. 9 (not shown in FIG. 3) which are defined on the inside or inner surface 38 of the base. Each recessed connector 36 is sized and configured to removably receive and engage a complementary shaped (also racetrack shaped) elongated member or end connector 40 to removably attach each end of strap 42 to base 28. To enable this attachment, each recessed connector member 36 defines a slot 44 through which an end connector 40 is inserted (See FIG. 2) to enable the end connector 40 to be received in and engaged by a recessed connector member 36 which as mentioned is located on and recessed into the inside surface 38 of the base (see FIG. 8A).

Figures 7, 8:
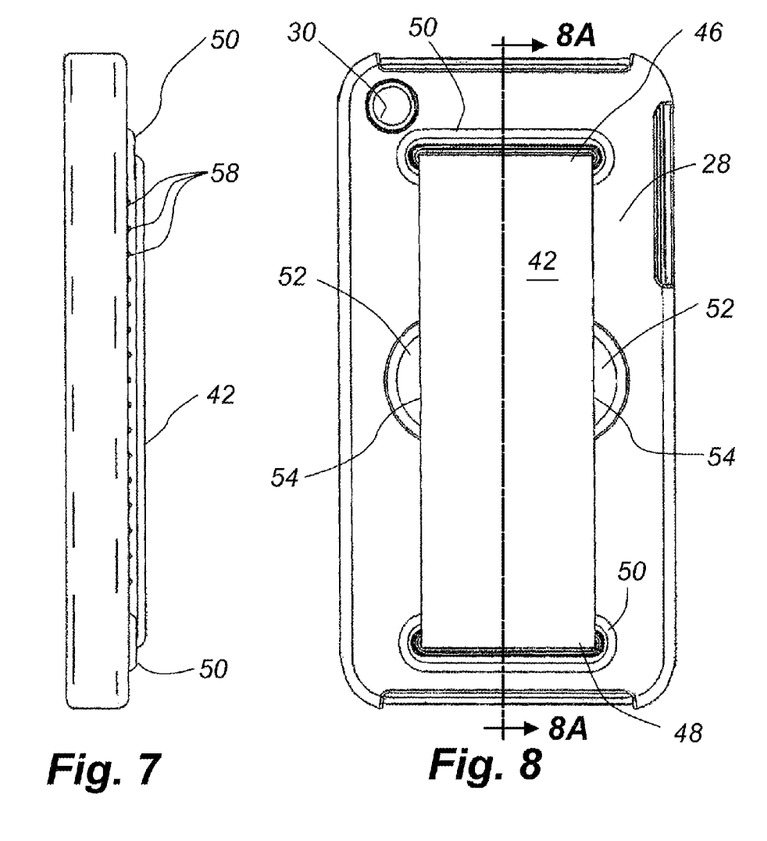
FIG. 7 is a side elevational view of the case assembly of FIG. 6.
FIG. 8 is a rear elevational view of the case assembly of FIG. 6.
Figure 8A:
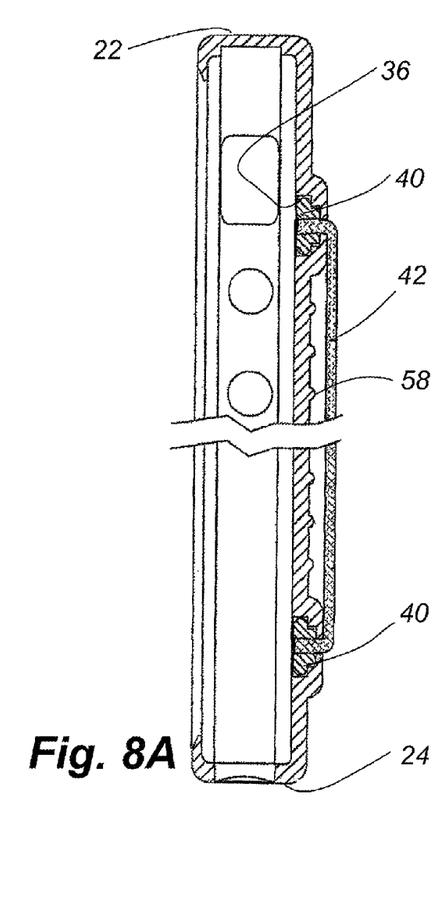
FIG. 8A is a cross-sectional view of the case assembly of FIG. 6 taken along lines 8A-8A of FIG. 8.
Figure 12:
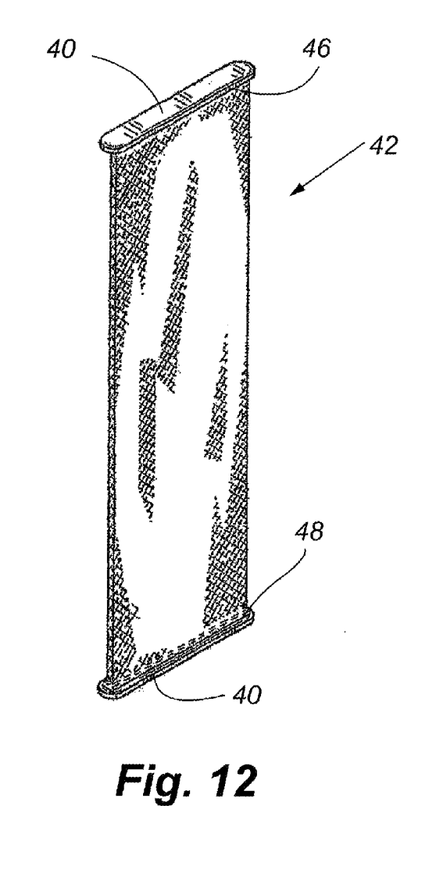
FIG. 12 is a perspective view showing in isolation the removable strap of the protective case assembly of FIG. 1.
Figure 13:
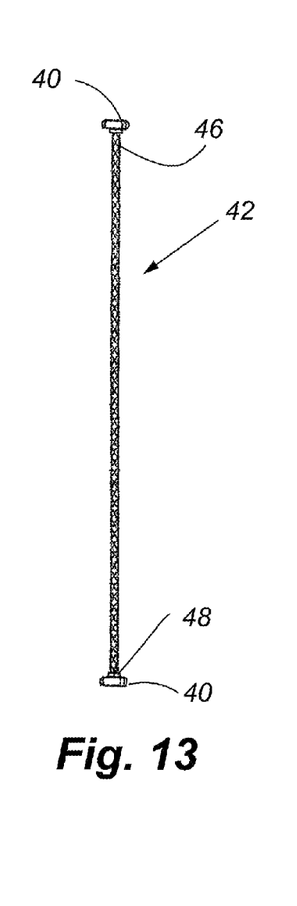
FIG. 13 is a side elevation of the removable strap shown in FIG. 12.

As shown in isolation in FIGS. 12-13, each end 46, 48 of strap 42 is provided with an end connector 40 which is preferably injection molded about its end of the strap. When each end connector 40 is received in its respective recessed connector member 36 on the inside surface 38 of the base, strap 42 as shown in FIGS. 1, 2, 7 and 8 extends through each slot 44 and against the outside surface (not numbered) of the base. In the preferred embodiment shown, each slot 44 is provided with a racetrack shaped raised rib 50 which extends around each slot 44. Raised rib 50 is provided with a predetermined height of preferably about 3 mm (which may be extended up to between 5-10 mm) to provide support in this area of the base and to prevent the strap from actually contacting or resting against the outside surface of the base, as shown in FIG. 7. This makes it easier for individual to place a finger under the strap as described in more detail below.

Figure 9:
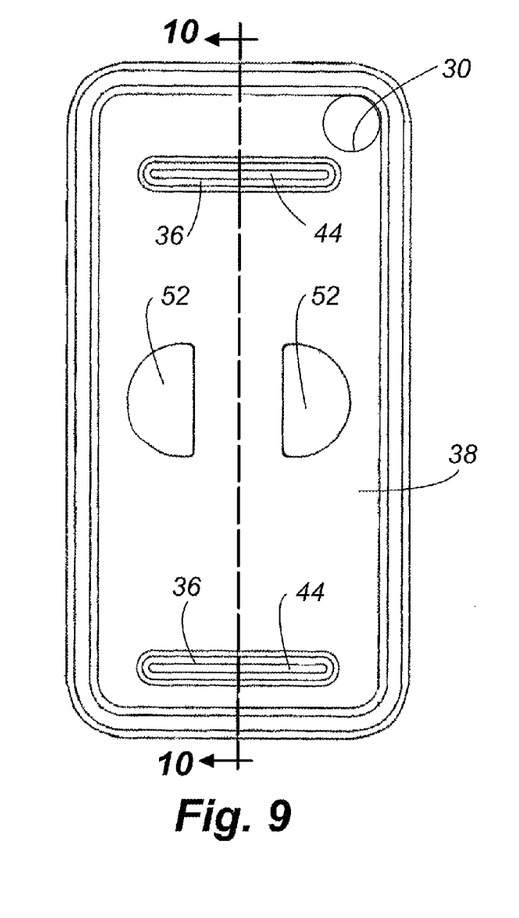
FIG. 9 is a front elevational view of the protective case assembly of FIG. 1.
Figure 10:
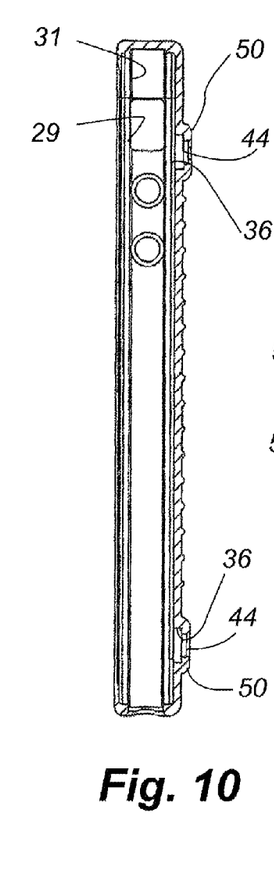
FIG. 10 is a side elevational view of the protective case assembly of FIG. 9.
Figure 11:
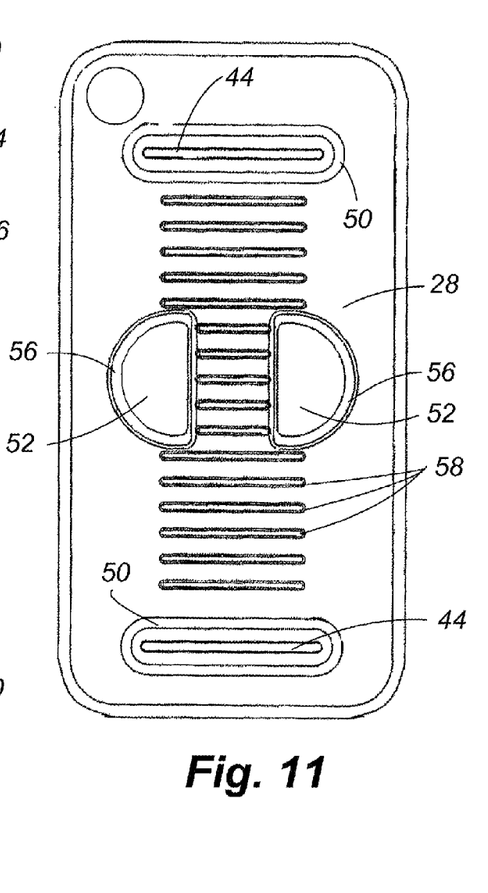
FIG. 11 is a rear elevational view of the protective case assembly of FIG. 9.

FIGS. 8, 9 and 11 also show that base 28 is provided with a pair of openings 52 that extend through base 20 and are located on the base so that they extend under and beyond the edges 54 of strap 42. The openings also facilitate the insertion of one's finger under the strap since they allow an individual to place a finger tip under the strap and then lift slightly on the strap to enable the user to more fully insert their finger under the strap. Openings 52 are also preferably defined by beveled edges 56 on the outside of the base; again, to facilitate the insertion of a finger under the strap. In addition, the outside surface of base 28 is also provided with gripping ridges 58 (see FIGS. 7 and 11) which serve to prevent an individual's finger from easily sliding under the strap when it is inserted under the strap. This also helps facilitate operation and manipulation of the handheld device as described in more detail below.

From the foregoing description, it will be appreciated that cooperating racetrack shaped connectors 36, 40 allow strap 42 to be easily removed from the shell should the user ever desire to remove the strap. To remove the strap, the user simply pushes the strap inwardly through slot 44 to take the holding pressure off end connector 40. The user then simply lifts the end connector out of the recessed connector member and slides it back through slot 44 to remove it from the shell.

In addition, it will be appreciated that each pair of cooperating connectors 36, 40 are identical. However, they could be different and/or both ends of the strap could be permanently affixed to base 28 or for that matter the strap could extend all the way to sides 22, 24 as shown in FIGS. 14-15 which provides a different mechanism for attaching a strap 542 to the case 510 which inserts a rod-shaped member 540 which is molded into the ends of the strap into a rod-shaped sleeve (not numbered) that is molded into the sides of the case 510.

Figures 14, 15:
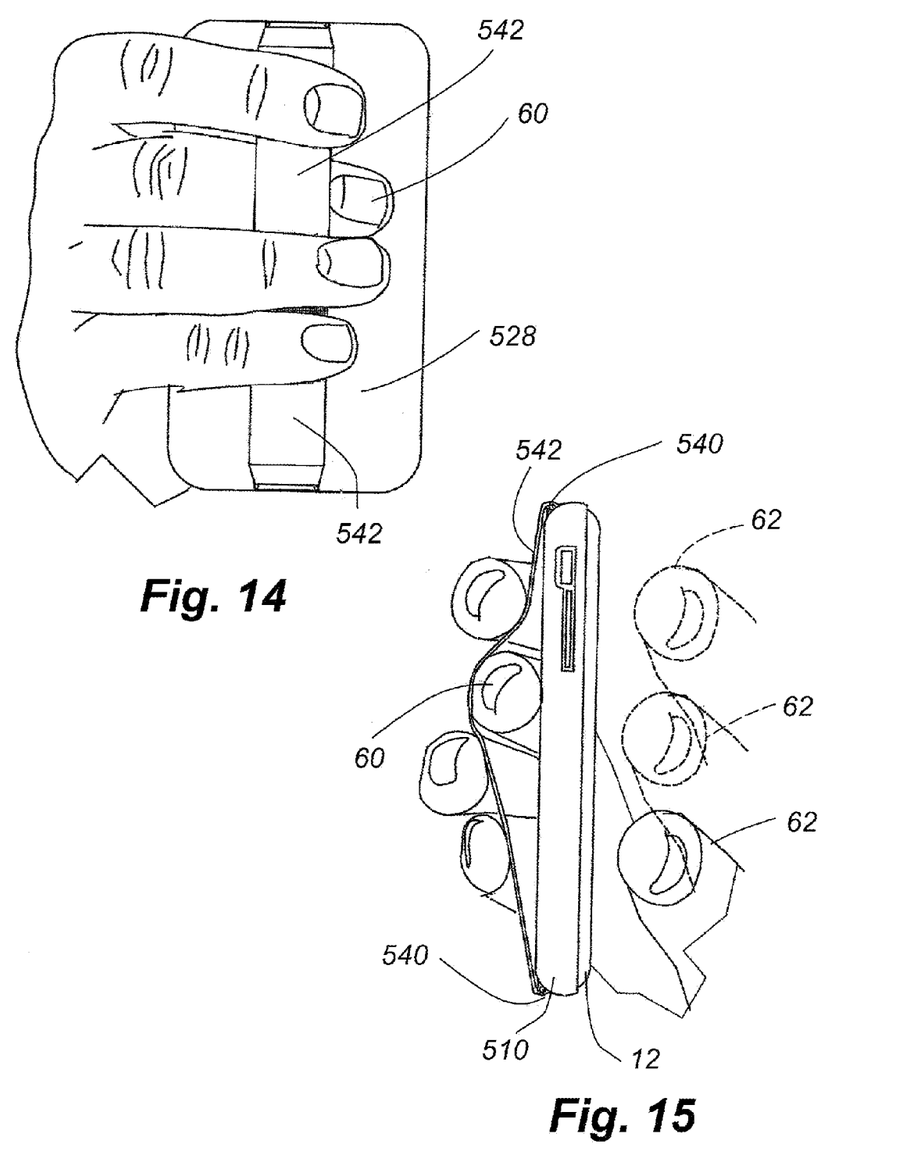
FIG. 14 is a rear elevational view showing an individual's middle finger positioned under the strap of yet another embodiment of the present invention.
FIG. 15 is a side elevational view of FIG. 14 which additionally shows three positions for the thumb which demonstrates the ease with which the thumb can move around on the face of the handheld device to operate the device.

Turning now to the method of the present invention for manipulating a handheld device held in a case of the present invention, FIGS. 14-15 illustrate the insertion and placement of an individual's middle finger 60 under strap 542 which enables the device to be easily manipulated and operated with the thumb 62 shown in FIG. 15 of the same hand. FIG. 15 shows three positions for the thumb which demonstrates the ease with which the thumb can move around on the face of the handheld device to press keys on the face of the device whether they are real keys or virtual touch keys. While a single middle finger 60 is shown inserted under the strap, some users may find that it is desirable to insert two fingers under the strap. Insertion of three fingers however is generally unnecessary and in fact is generally undesirable since it tends to make it more difficult for an individual to reach all areas on the face of the handheld device with the thumb. Those skilled in the art will appreciate that the present invention makes one handed operation of a handheld device quite easy and therefore should be quite popular with users who often find themselves with a need to operate a handheld device such as a cell phone in one hand while doing something with the other hand such holding a hot beverage, pulling luggage through an airport, holding a baby, managing a purse or brief case and working a computer mouse or anywhere where there is a need to make sure the cell phone is not dropped such as while riding on a chair lift or working around water, boats and docks, etc.

In any event, to enable a handheld device to be easily manipulated or operated as discussed above, it is desirable that strap 42 be fairly taut so that a user's finger or fingers are securely held against the base of the case. The necessary tautness would normally make it somewhat difficult to insert a finger under the strap but as long as finger tip access slots 52 are provided in the case and the strap is located slightly off the surface of the base as discussed above, insertion of a user's finger under the strap is quite easy.

Other variables which affect the ability of a user to manipulate the device are the length and width of the strap and the material out of which the strap is made. In the preferred illustrated embodiment, the strap is about 31.5 mm wide and about 86.5 mm long and the material for the strap is preferably a fabric elastic band. Of course, all of these variables will change somewhat if the dimensions of the case are changed to accommodate other handheld devices.

Figures 4, 5:
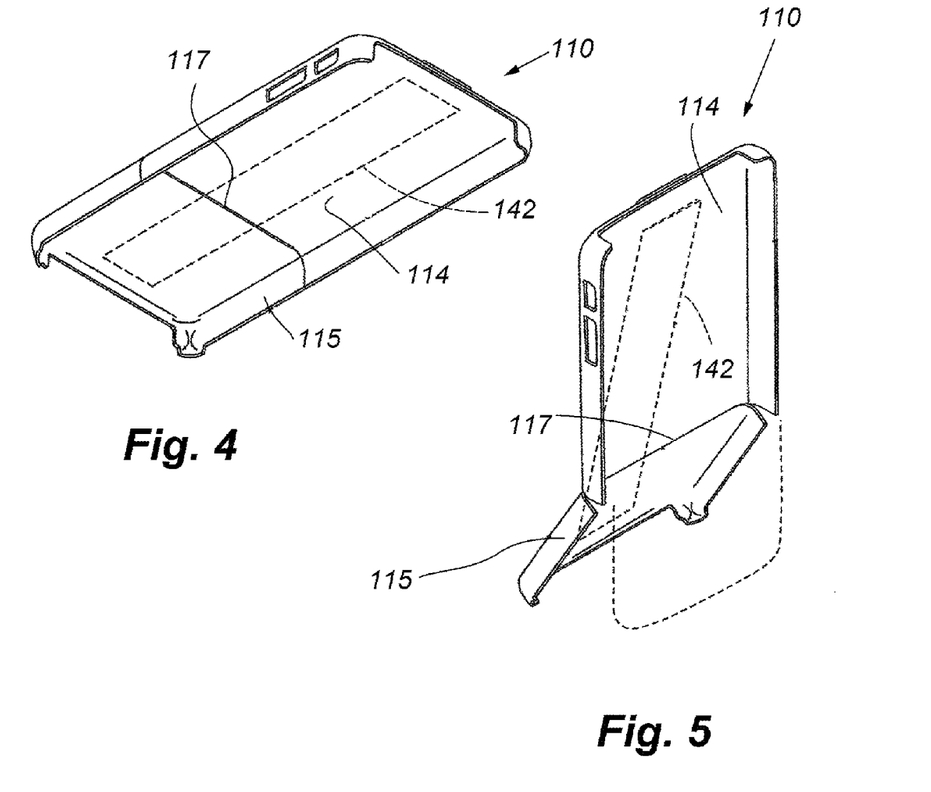
FIG. 4 is a perspective view showing the front side of a protective case assembly similar to that of FIG. 1 but which is provided in two sections that are hinged together.
FIG. 5 is a perspective view showing the front side of the protective case assembly of FIG. 4 which shows the assembly with the lower section of the case pivoted rearwardly which enables the case assembly to hold a handheld device shown in phantom in an upright position.
Figure 6:
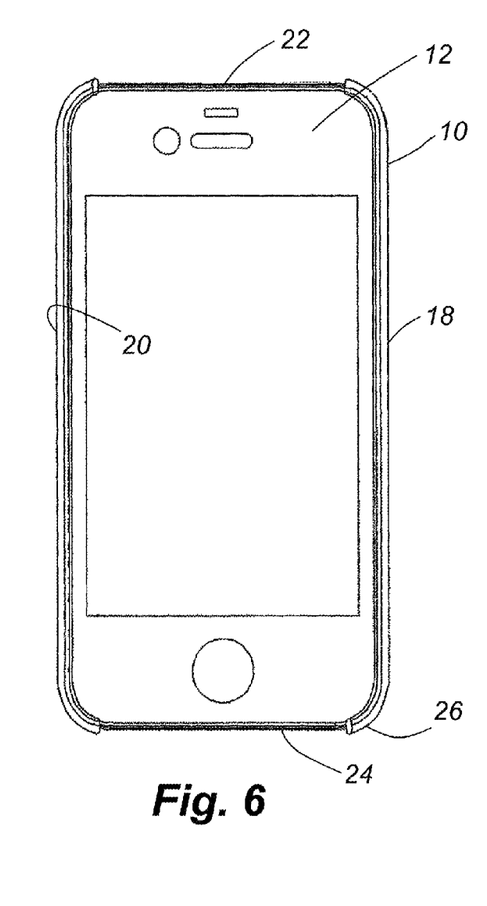
FIG. 6 is a front elevational view showing the protective case assembly of FIG. 1 holding a mobile phone.

FIGS. 4-5 illustrate another embodiment 110 of the present invention in which shell 14 of case 10 is provided in two sections 114, 115 which are hinged together with a living hinge 117 that extends across the base of the shell as shown. This embodiment allows the case to be easily opened to insert, e.g., a charger element into the device or it can be used as a stand to hold the device in an upright position for easy viewing of pictures or a movie.

Figure 16:
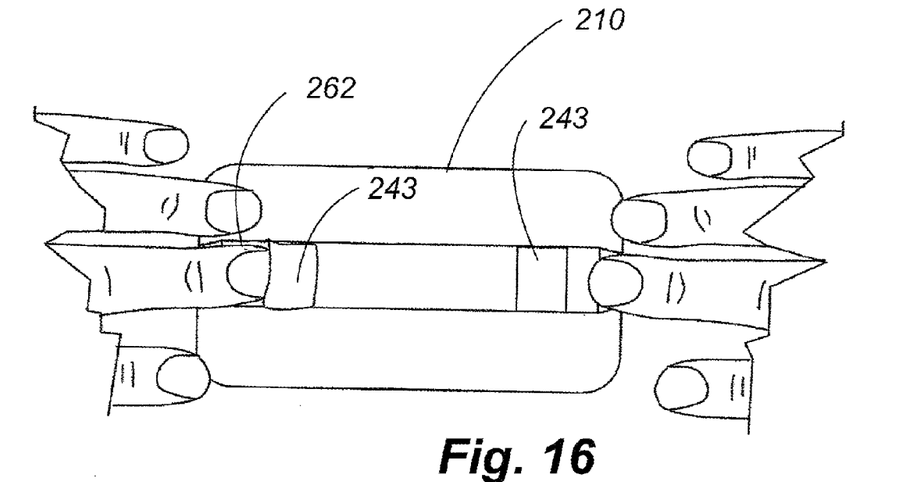
FIG. 16 is a rear elevational view showing yet another embodiment of the present invention in which the strap of the case assembly is provided with a pair of finger tip receiving spaced elastic rings which are attached to opposite ends of the strap.
Figure 17:
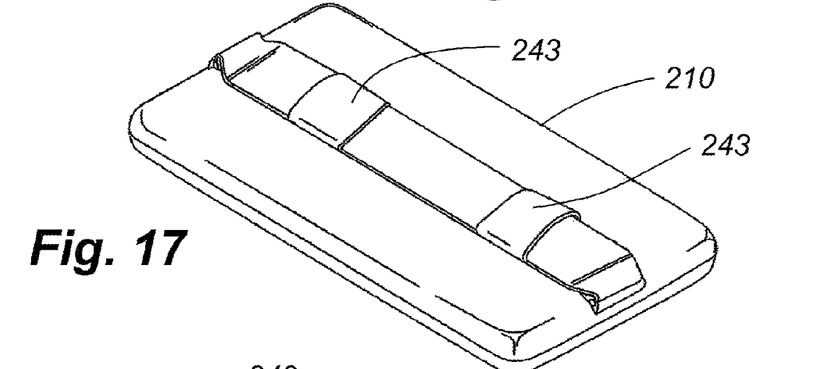
FIG. 17 is a perspective view of the case assembly of FIG. 16.
Figure 18:
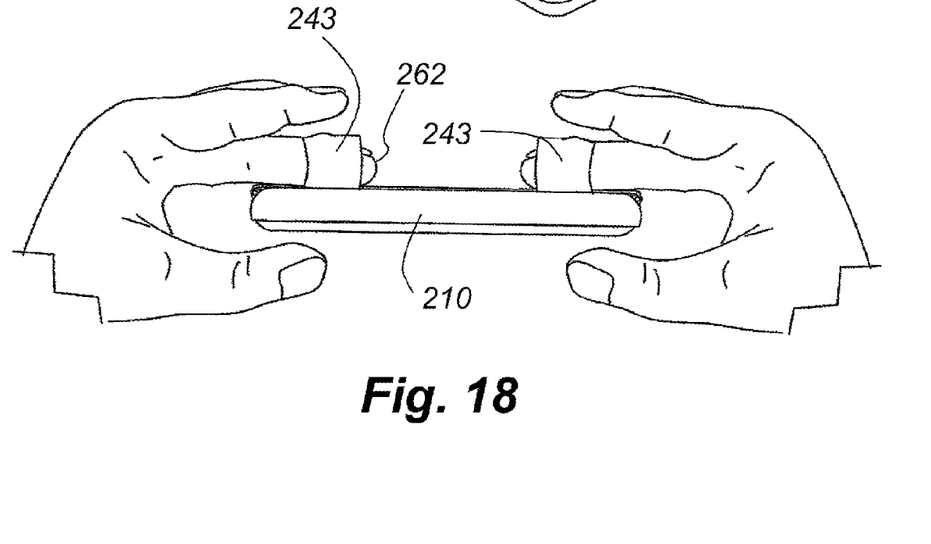
FIG. 18 is a top plan view of the case assembly of FIG. 16.

FIGS. 16-18 illustrate another embodiment 210 of the present invention in which strap 242 is provided with a pair of spaced elastic rings 243 which are attached to opposite ends of the strap. As shown, each ring is sized and configured to receive a finger 262 of the user so that the device can be held in a horizontal or landscape orientation. Rings 243 may be stitched to strap 242 or looped about strap 242 so that the ring's position on strap 242 can be moved anywhere along the strap.

Figure 19:
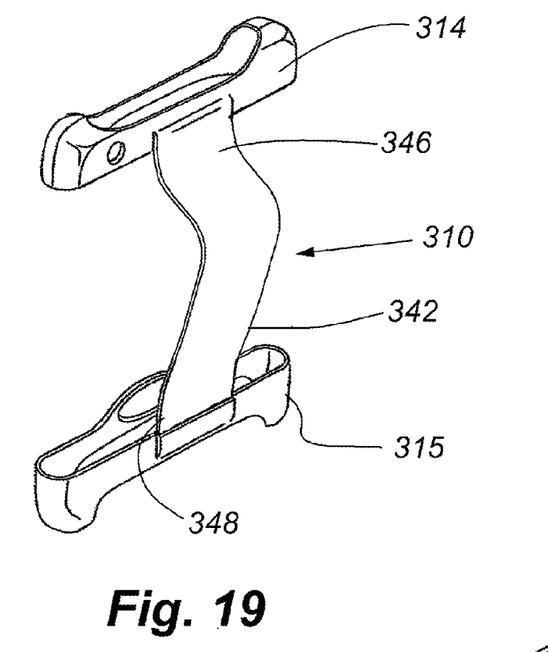
FIG. 19 is a perspective view showing the backside of yet another embodiment of a case assembly referred to as a manipulator of the present invention for a mobile phone.
Figure 20:
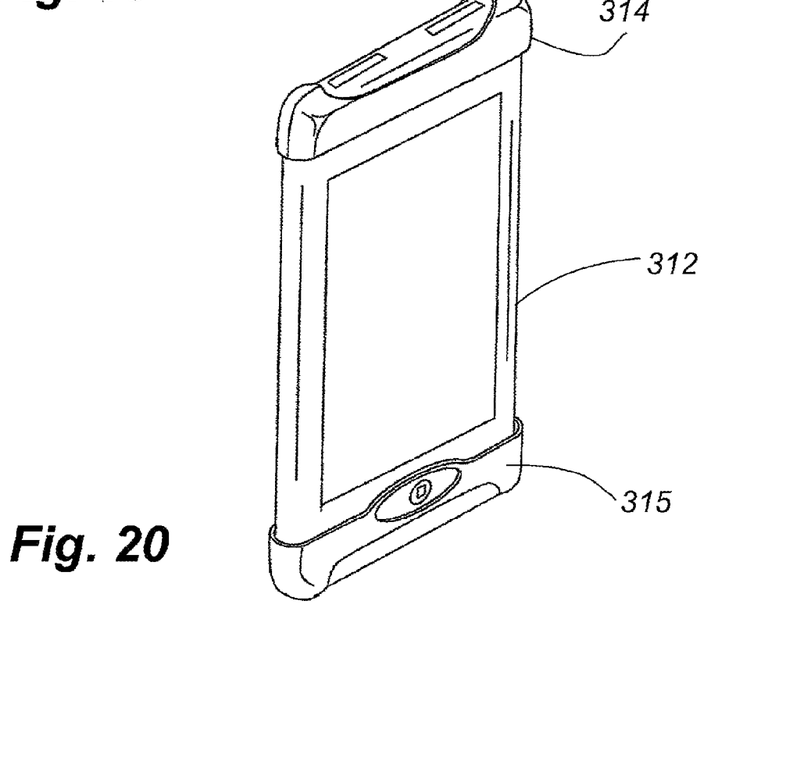
FIG. 20 is a perspective view showing the front side of the manipulator of FIG. 19 holding a mobile phone.

FIGS. 19-20 illustrate yet another embodiment 310 of the present invention which does not provide a case for a handheld device but does enable a user to control or manipulate a handheld device 312 in one hand. This embodiment is referred to as a manipulator and it includes a pair of upper and lower end caps 314, 315. The upper end cap as shown is sized and configured to fit over the upper end of handheld electronic device 312 while the lower end cap 315 is sized and configured to fit over the lower end of the handheld device.

Manipulator 310 also includes an elongated elastic strap 342 of predetermined width and length and having sides (not numbered). Strap 342 terminates at first and second ends 346, 348 with end 346 attached to upper end cap 314 and end 348 attached to lower end cap 315. The strap's width and length as well as the material it's made out of is predetermined (selected) so that when the upper and lower end caps are fitted over their respective ends of the handheld device a side of the strap will be positioned against the backside (not shown) of the handheld device and will be taut against the backside.

Like strap 42 of the first illustrated embodiment, the predetermined length, width and tautness of the strap enables the handheld device to be held in one hand and manipulated with the thumb of the hand when one or two of the three middle fingers of an individual's same hand are placed under the taut strap 342 which is positioned against the backside of the handheld device.

Figure 21:
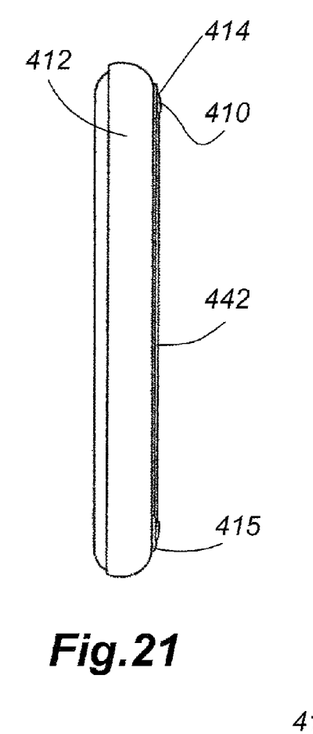
FIG. 21 is a side elevational view of yet another embodiment of the present invention also referred to as a manipulator which is shown holding a mobile phone.
Figure 22:
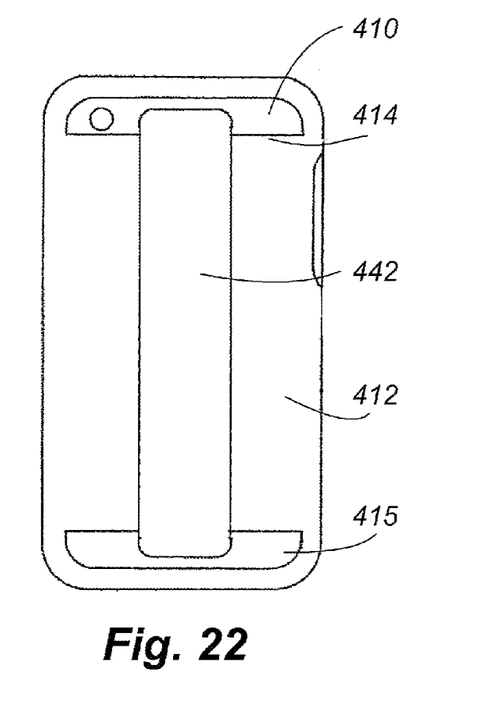
FIG. 22 is a rear elevational view of the manipulator and phone shown in FIG. 21.
Figure 23:
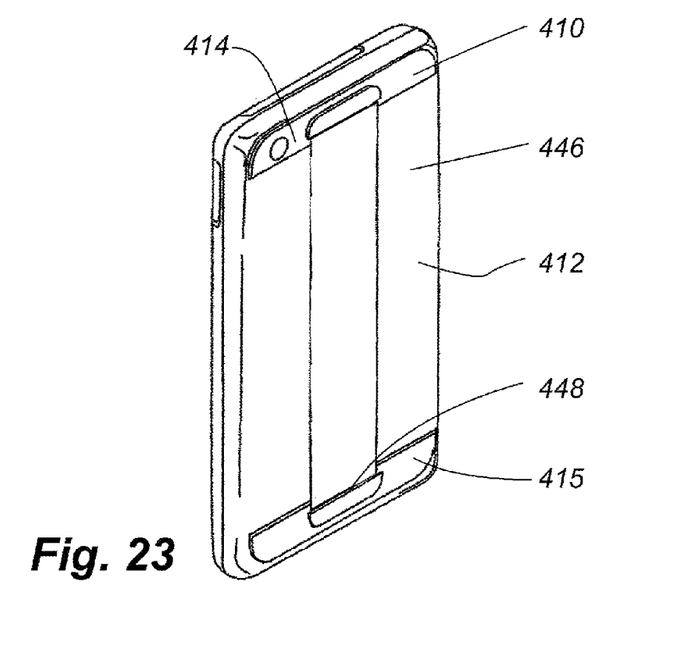
FIG. 23 is a perspective rear view of the manipulator and phone shown in FIG. 21.

FIGS. 21-23 illustrate yet another embodiment 410 of the present invention which is similar to embodiment 310 in that it does not provide a case for a handheld device but does enable a user to control or manipulate a handheld device 412 in one hand. This embodiment is also referred to as a manipulator and it includes a pair of upper and lower adhesive backed rigid strips 414, 415. The upper strip as shown is adhesively attached to the upper end of handheld electronic device 412 while the lower strip 415 is adhesively attached to the lower end of the handheld device.

Manipulator 410 also includes an elongated elastic strap 442 of predetermined width and length and having sides (not numbered). Strap 442 terminates at first and second ends 446, 448 with end 446 attached to upper strip 414 and end 448 attached to lower strip 315. The strap's width and length as well as the material it's made from is predetermined (selected) so that when the upper and lower rigid strips are adhesively attached to their respective ends of the handheld device the strap will be positioned against the backside (not shown) of the handheld device and taut.

Like strap 42 of the first illustrated embodiment, the predetermined width, length and tautness of the strap enables the handheld device to be held in one hand and manipulated with the thumb of the same hand when one or two of the three middle fingers of again the same hand are placed under the taut strap 342 which is positioned by the manipulator against the backside of the handheld device.

Figure 24:
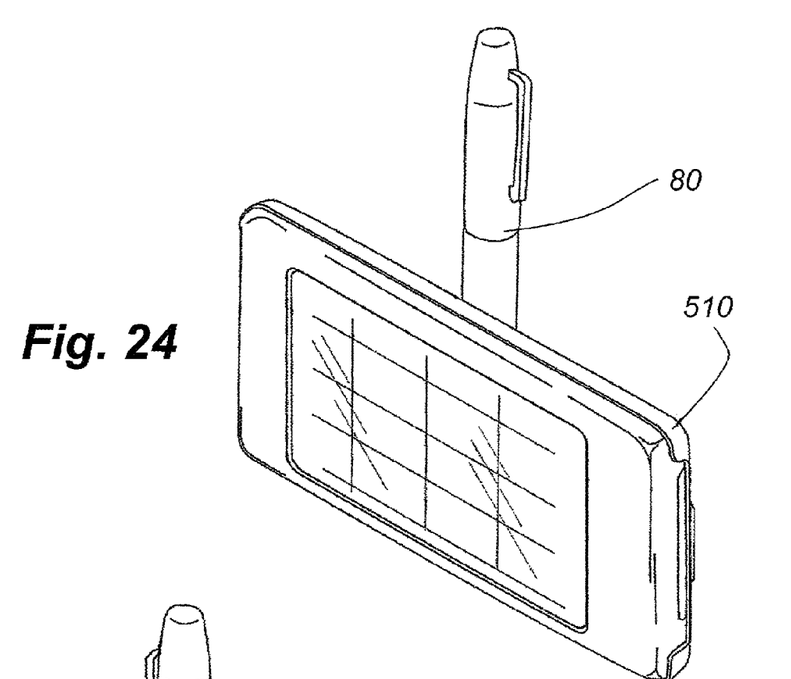
FIG. 24 is a perspective view showing the case assembly of FIG. 4 holding a mobile phone and having a pen inserted under the case assembly's strap which enables the case and phone to be positioned in an upright landscape position as shown; and, FIG. 25 is a rear perspective view of the case assembly, phone and pen shown in FIG. 24.
Figure 25:
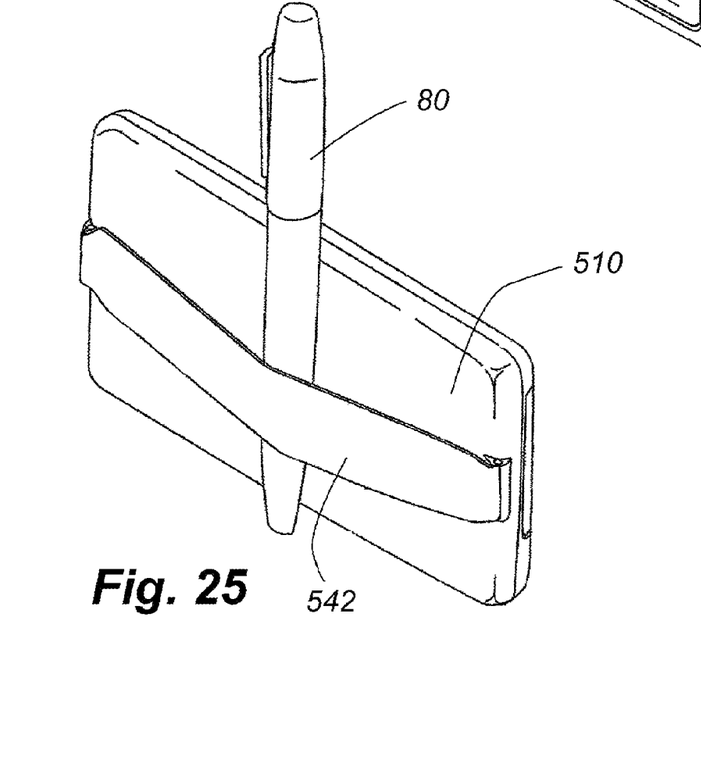

FIGS. 24 and 25 show that a pen 80 may be inserted under the strap 542. As will be appreciated, the insertion of a pen or other similar structure under the strap as shown enables the case to be positioned in an upright landscape position which is a desirable position for viewing movies and photographs on the handheld device.

Other Embodiments

It should be noted that there are other embodiments which are anticipated but not necessarily depicted in the figures. These would include a stretchable ring, sized for one of more fingers that attaches at a fixed point on the back or sides of the device to be controlled, or slides in an elongated channel of a protective case structure that allows full 360 degree rotation and movement in the channel up and down the back of the device. Others would include a belt clip apparatus having a blade or horizontal structure whereby the control structure detailed in one of the figures would slip over the belt clip blade and be retained as a shock absorbing hip mounted carrying system. Further, the control structure detailed in the figures could be threaded through a belt for a more secure and less removable shock absorbing hip mounted carrying system. Further, rubber dots or strips may be applied or molded onto the control structure to prevent slipping and sliding of the device when placed on the dash of a automobile, or boat, etc.

Accordingly, the present innovative device has been described with some degree of particularity directed to several possible embodiments of the present invention. It should be appreciated, though, that modifications or changes may be made to the embodiments presented here without departing from the inventive concepts contained herein. Further, it should be noted that this document is NOT intended to be all inclusive of what is claimed regarding this invention.

I claim:

1. A method for manipulating a handheld electronic device such as a cell phone, mobile smart phone and the like, said method comprising the steps of:
providing a thin protective case assembly for a generally thin handheld device such as a cell phone, mobile smart phone and the like, said protective case assembly comprising:
a shell defining an open front and having sides and a base which adjoins said shell's sides, said shell attaching to a said handheld device by being sized and configured to fit over the backside and sides of a said handheld device; and,
an elongated elastic strap which is attached at its ends to the back of the shell and positioned so that it is located against the shell's base, said strap also being sufficiently taut to enable the handheld device to be held in one hand and operated with the thumb of the same hand when up to two of the three middle fingers also of the same hand are placed under the taut strap;
inserting a handheld device having real or virtual keys located on the front of the device into the shell;
placing up to two of the three middle fingers of one hand under the taut strap positioned against the base of the shell; and
operating the device in one hand by pressing the real or virtual keys located on the front of the device with a thumb of the same hand when up to two of the three middle fingers of the same hand are placed under the taut strap.

2. A thin protective case assembly for a generally thin handheld device such as a cell phone, mobile smart phone and the like, said protective case assembly comprising:
a shell defining an open front and having sides and a base which adjoins said shell's sides, said shell attaching to a said handheld device by being sized and configured to fit over the backside and sides of a said handheld device;
an elongated elastic strap which is attached at its ends to the back of the shell and positioned so that it is located against the shell's base, said strap also being sufficiently taut to enable the handheld device to be held in one hand and operated with the thumb of the same hand when up to two of the three middle fingers also of the same hand are placed under the taut strap.

3. A method for manipulating a handheld electronic device such as a cell phone, mobile smart phone and the like, said method comprising the steps of:
providing a thin protective case assembly for a generally thin handheld device such as a cell phone, mobile smart phone and the like, said protective case assembly comprising:
a shell defining an open front and having sides and a base which adjoins said shell's sides, said shell attaching to a said handheld device by being sized and configured to fit over the backside and sides of a said handheld device;
a removable elongated elastic strap of predetermined length and width which terminates at first and second ends;
a first connector located at said first end of said strap;
a second connector located at a first end of said shell base for cooperating with said first connector to removably attach said first end of said strap to said first end of said shell's base;
a third connector located at said second end of said strap; and
a fourth connector located at a second end of said shell's base for cooperating with said third connector to removably attach said second end of said strap to said second end of said shell's base so that when said first and second ends of the strap are attached to said first and second ends of said shell's base said strap will be positioned against said base and sufficiently taut to enable said handheld device to be held in one hand and operated with the thumb of the same hand when up to two of the three middle fingers also of the same hand are placed under the taut strap;
inserting a handheld device having real or virtual keys located on the front of the device into the shell;
placing up to two of the three middle fingers of one hand under the taut strap positioned against the base of the shell;

operating the device in one hand by pressing the real or virtual keys located on the front of the device with a thumb of the same hand when up to two of the three middle fingers of the same hand are placed under the taut strap.

4. A method as claimed in claim 3 further comprising the step of removing the strap from the shell.

5. A thin protective case assembly for a generally thin handheld device such as a cell phone, mobile smart phone and the like, said protective case assembly comprising:
   a shell defining an open front and having sides and a base which adjoins said shell's sides, said shell attaching to a said handheld device by being sized and configured to fit over the backside and sides of a said handheld device;
   a removable elongated elastic strap of predetermined length and width which terminates at first and second ends;
   a first connector located at said first end of said strap;
   a second connector located at a first end of said shell base for cooperating with said first connector to removably attach said first end of said strap to said first end of said shell's base;
   a third connector located at said second end of said strap;
   a fourth connector located at a second end of said shell's base for cooperating with said third connector to removably attach said second end of said strap to said second end of said shell's base so that when said first and second ends of the strap are attached to said first and second ends of said shell's base said strap will be positioned against said base and sufficiently taut to enable said handheld device to be held in one hand and operated with the thumb of the same hand when up to two of the three middle fingers also of the same hand are placed under the taut strap.

6. A protective case assembly as claimed in claim 5 wherein said strap which is positioned against said base of said case is located within 5 mm of the surface of said base.

7. A protective case assembly as claimed in claim 5 wherein said strap which is positioned against said base of said case is in contact with the surface of said base.

8. A thin protective case assembly as claimed in claim 5 wherein the shell is made from a resilient hard plastic.

9. A thin protective case assembly as claimed in claim 5 wherein the shell is made from a soft pliable rubber material.

10. A thin protective case assembly as claimed in claim 5 wherein the first and third connectors are identical and the second and fourth connectors are identical.

11. A thin protective case assembly as claimed in claim 5 wherein said first and third connectors are elongated members and said second and fourth members are elongated recessed members defined on the inside surface of said shell base, each said recessed members being sized and configured to receive and engage an elongated member to attach said elongated member to said base, each recessed member also defining a slot through which an elongated member is inserted to enable said elongated member to be received in and engaged by a said recessed member.

12. A thin protective case assembly as claimed in claim 11 wherein a said elongated member is molded about each said first end and said second end of said strap.

13. A thin protective case assembly as claimed in claim 5 having a generally rectangular shape wherein said base is also rectangularly shaped and adjoins four said sides which extend around the periphery of said base, two of said sides being long sides and two of said sides being short sides and wherein said strap is attached to said base so that it extends lengthwise against said base and is generally parallel to said long sides of said case.

14. A thin protective case assembly as claimed in claim 13 wherein said strap is generally centered on the base of the case.

15. A thin protective case assembly as claimed in claim 5 wherein said base defines finger tip access slots for facilitating placement of a user's finger under said strap.

16. A thin protective case assembly as claimed in claim 5 wherein a said side of said case defines openings which are sized and configured to allow a user to access features of the handheld device.

17. A thin protective case assembly as claimed in claim 5 wherein said shell is provided in two sections which are hinged together with a hinge that extends across said base of the shell.

18. A thin protective case assembly as claimed in claim 17 wherein said hinge is a living hinge.

19. A thin protective case assembly as claimed in claim 5 wherein said strap is provided with a pair of spaced elastic rings which are attached to opposite ends of said strap, each strap being sized and configured to receive a finger.

20. A handheld electronic device manipulator comprising:
    a pair of upper and lower end caps, said upper end cap being sized and configured to fit over the upper end of a handheld electronic device, said lower end cap being sized and configured to fit over the lower end of a handheld electronic device; and
    an elongated elastic strap of predetermined length and width which terminates at first and second ends wherein said first end is attached to said upper end cap and said second end is attached to said lower end cap so that when said upper and lower end caps are fitted over their respective ends of the handheld device said strap will be positioned against the backside of the handheld device and sufficiently taut to enable said handheld device to be held in one hand and operated with the thumb of the same hand when up to two of the three middle fingers also of the same hand are placed under the taut strap.

21. A handheld manipulator as claimed in claim 20 wherein said strap which is positioned against said backside of the handheld device is located within about 5 mm of the surface of the device's backside.

22. A handheld electronic device manipulator comprising:
    a pair of upper and lower rigid adhesive strips, said upper strip being sized and configured to be adhesively secured to the upper end of the backside of a handheld electronic device, said lower strip being sized and configured to be adhesively secured to the lower end of the backside of a handheld electronic device; and
    an elongated elastic strap of predetermined width and length which terminates at first and second ends wherein said first end is attached to said upper strip and said second end is attached to said lower strip so that when said upper and lower strips are adhesively secured to their respective ends of the handheld device said strap will be positioned against the backside of the handheld device and sufficiently taut to enable said handheld device to be held in one hand and operated with the thumb of the same hand when up to two of the three middle fingers also of the same hand are placed under the taut strap.

23. A method as claimed in claim 1 further comprising inserting a pen or other structure under the strap to enable positioning of the device in an upright landscape position.

* * * * *